United States Patent [19]

Huber

[11] Patent Number: 5,293,545
[45] Date of Patent: Mar. 8, 1994

[54] OPTICAL SOURCE WITH REDUCED RELATIVE INTENSITY NOISE

[75] Inventor: David R. Huber, Warrington, Pa.

[73] Assignee: General Instrument Corporation, Hatboro, Pa.

[21] Appl. No.: 919,924

[22] Filed: Jul. 27, 1992

[51] Int. Cl.⁵ .................... H01S 3/10; H01S 3/102
[52] U.S. Cl. .................... 359/111; 359/161; 359/180; 359/181; 359/188
[58] Field of Search ............ 359/111, 161, 180, 181, 359/182, 183, 188

[56] References Cited

U.S. PATENT DOCUMENTS

| | | | |
|---|---|---|---|
| 4,287,606 | 9/1981 | Lutes, Jr. et al. | 359/181 |
| 5,073,983 | 12/1991 | Pfizenmayer | 359/161 |
| 5,126,871 | 6/1992 | Jeffers | 359/181 |
| 5,128,950 | 7/1992 | Tsuchiya et al. | 359/181 |

Primary Examiner—Wellington Chin
Attorney, Agent, or Firm—Barry R. Lipsitz

[57] ABSTRACT

Apparatus is provided for producing an optical carrier with low relative intensity noise. A portion of light output from a light source is sampled. An error signal representative of the relative intensity noise contained in the light output is generated. The error signal is subtracted from the light output from the light source to provide an optical carrier in which the relative intensity noise has been substantially reduced. The error signal can be subtracted using either an external optical intensity modulator or by converting the electrical signal to an optical signal and directly coupling it to the light output from the light source.

16 Claims, 3 Drawing Sheets

OPTICAL SOURCE WITH REDUCED RELATIVE INTENSITY NOISE

BACKGROUND OF THE INVENTION

The present invention relates to optical communication systems, and more particularly to an optical source having reduced relative intensity noise (RIN).

An important aspect of a communication system is its ability to distinguish the signal from the noise and thereby yield a distortion free and error free reproduction of the original signal. Thermal noise results from the agitations of molecules within a system, which typically increase with temperature. In a simple resistor, random and erratic wanderings of the electrons within the resistor structure will cause statistical fluctuations away from electrical neutrality. Thus, at one time or another the distribution of charge may not be uniform, causing a voltage difference to appear between the resistor terminals. The random, erratic, unpredictable voltage which results is referred to as thermal resistor noise.

A second type of noise results from a phenomenon associated with the flow of current across semiconductor junctions. The charge carriers, electrons or holes, enter the junction region from one side, drift or are accelerated across the junction, and are collected on the other side. Although the average junction current determines the average interval that elapses between the times when two successive carriers enter the junction, the exact interval that elapses is subject to random statistical fluctuations. This randomness gives rise to a type of noise that is commonly referred to as shot noise.

Optical communication systems are not immune to such noise phenomena. For example, the problem of photon noise is discussed in P. R. Morkel, R. I. Laming, H. O. Edwards and D. N. Payne, "Elimination of Excess Photon Noise from Fiber Superluminescent Sources," Paper CTuH76 presented at the CLEO Conference in Anaheim, Calif. on May 22, 1990. It is well known that the relative intensity noise of a superluminescent source is high. Most lasers used in optical communication systems also suffer from a relatively high level of RIN.

Higher RIN levels increase the noise floor of an optical carrier generated by a light source. The noise floor of an optical carrier is advantageously as low as possible. For example, an RIN on the order of $-125$ dB/Hz is generally acceptable. Once the RIN rises to above $-100$ dB/Hz or so, the signal quality will suffer appreciably.

It would be advantageous to provide apparatus for producing an optical carrier with low relative intensity noise. Such apparatus should be easy to implement and cost effective. It would be further advantageous to provide such apparatus that is successful in reducing the RIN level of various types of light sources, including superluminescent sources and lasers.

The present invention provides apparatus having the aforementioned advantages.

SUMMARY OF THE INVENTION

In accordance with the present invention, apparatus is provided for producing an optical carrier with low relative intensity noise. A light source, such as a superluminescent source or laser is provided. Means are provided for sampling a portion of the light output from the light source, and for generating an error signal from the sampled portion. The error signal is representative of relative intensity noise contained in the light from the light source. The error signal is subtracted from light output from the light source to provide an optical carrier in which the relative intensity noise has been substantially reduced.

The subtracting means can comprise, for example, a first external optical modulator coupled to modulate the light output from the light source and to receive the error signal as a modulating input. The subtracting means can further comprise an inverter for inverting the error signal prior to input to the external optical modulator. A second external modulator can be provided and coupled to receive the optical carrier output from the first external modulator. The second external modulator has a modulating input for receiving an information signal, and modulating the information signal onto the optical carrier.

In a preferred embodiment, means are provided for adjusting the phase and amplitude of the error signal to minimize the relative intensity noise in the optical carrier. Phase adjustment can be accomplished using a variable time delay. Amplitude can be adjusted by using a variable gain amplifier.

In the illustrated embodiments, the error signal is generated in the electrical domain. In order to accomplish this, means are provided for converting the sampled portion of light into an electrical signal. Means are also provided for converting the error signal to an optical signal for subtraction from the light output from the light source. An optical amplifier is provided for amplifying the light from the light source. An embodiment is disclosed in which the sampling means sample a first portion of light prior to the optical amplifier and a second portion of light after the optical amplifier. The error signal is generated from the difference between the first and second portions.

In an alternate embodiment of apparatus for producing an optical carrier with low relative intensity noise, a first light source produces light at a first wavelength $\lambda_1$. Means are provided for sampling a portion of the light output from the first light source and providing an electrical error signal therefrom. The error signal is representative of relative intensity noise contained in the light from the first light source. A second light source produces light at a second wavelength $\lambda_2$ and is responsive to the error signal to produce an optical error signal equivalent to the electrical error signal. Means are provided for combining the optical error signal with light output from the first light source to provide an optical carrier in which the RIN has been substantially reduced.

In the aforementioned embodiment, the optical carrier can be provided for use in a communications system having an electrical bandwidth $\beta$. The wavelengths $\lambda_1$ and $\lambda_2$ are selected to be substantially as close as possible without creating beat frequencies thereof within the bandwidth $\beta$. An optical amplifier can be provided to amplify the light from the first light source prior to the combining means. It is advantageous to couple a bandpass filter downstream of the optical amplifier to remove at least a portion of spontaneous emission introduced by the optical amplifier. In a preferred embodiment, the bandpass filter is coupled immediately downstream of the optical amplifier.

DETAILED DESCRIPTION OF THE INVENTION

The present invention provides apparatus for reducing the RIN of an optical carrier. This is accomplished by sampling the RIN at the output of a light source, and using the sample to generate an error signal that is fed forward and subtracted from the light that is output from the source. In this manner, a clean optical carrier is generated before the modulation of the carrier with an information signal.

Figure 1:
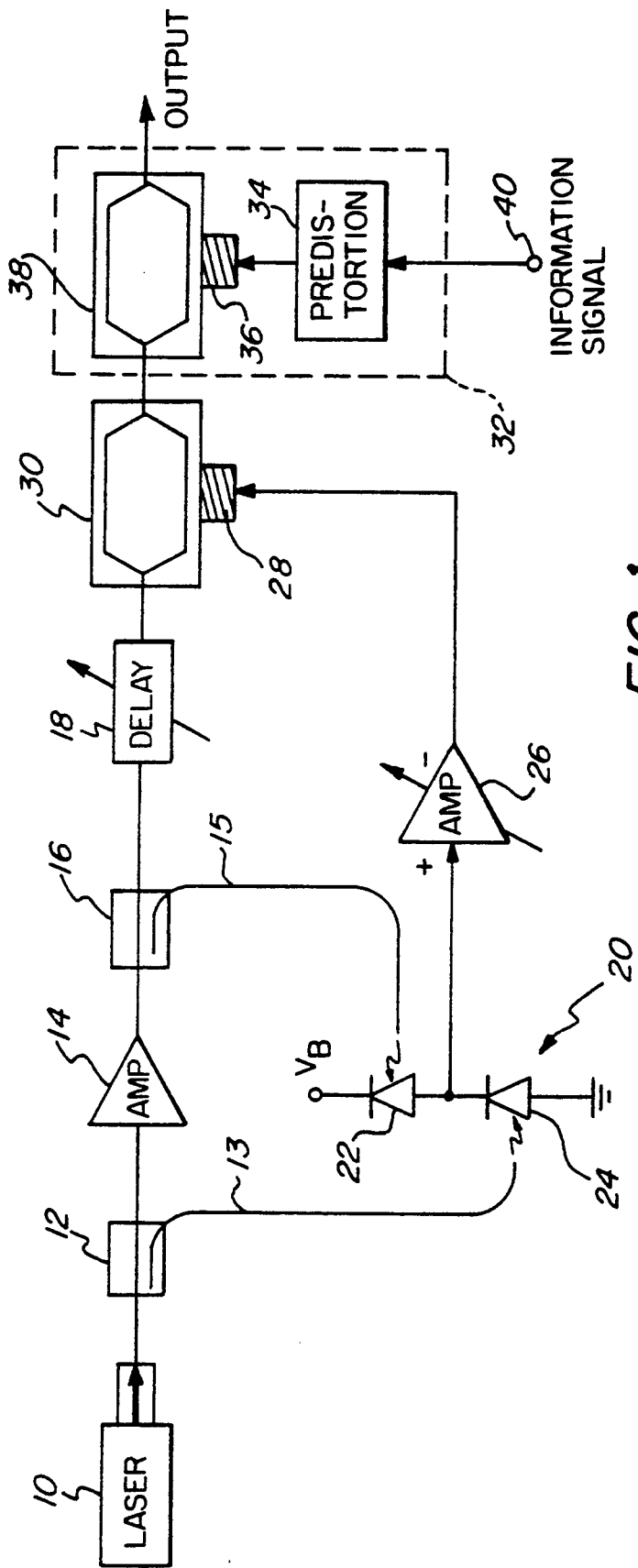
FIG. 1 is a schematic representation of a first embodiment of the present invention, in which a first external optical modulator receives an error signal and a second external optical modulator receives an information signal.

A first embodiment of the invention is illustrated in FIG. 1. A light source, such as a laser 10, provides light to an optical coupler 12. Optical couplers are well known in the art. For example, coupler 12 can comprise a directional coupler that provides a small portion of the input light energy to a fiber 13 which carries the sample to a first photodetector 24 of a photodetector pair 20. An optical amplifier 14 is provided in the primary light path that carries the bulk of the laser output energy for use in generating an optical carrier. Laser 10 and/or optical amplifier 14 may degrade the system noise floor.

In order to improve the noise floor, the sample of the laser output carried to photodetector 24 via fiber 13 is compared to a sample taken at the output of amplifier 14 via coupler 16. Specifically, a portion of the optical energy output from amplifier 14 is coupled to a second photodetector 22 via fiber 15. Photodetector pair 20 is biased with a voltage $V_B$ in a conventional manner, so that the difference between the sample carried on fiber 13 and the sample carried on fiber 15 will form an error signal that is input to a variable gain inverting amplifier 26. The amplified light output from inverting amplifier 26 is input to a modulating input 28 of an external optical modulator, such as a Mach Zehnder modulator 30. As a result, the error signal, which is representative of the RIN, is subtracted from the light in the primary path to reduce the RIN in the primary path. A variable optical delay 18, such as a length of optical fiber, delays the light propagation in the primary path by an amount that equals the error signal processing delay. In this manner, a disturbance propagating from optical coupler 16 to the output of modulator 30 in either the primary path or the error signal path will take the same amount of time to reach the output of the modulator. By providing an equal delay in each of the two paths, and adjusting variable gain inverting amplifier 26, the phase and amplitude of the error signal with respect to the optical carrier in the primary path will be provided such that excess intensity noise in the primary path will be substantially reduced by cancellation of the RIN.

The optical signal output from modulator 30 will be a clean optical carrier that can then be modulated with an information signal. Such modulation is provided by a linear modulator 32 that can comprise, for example, a predistortion circuit 34 and a second Mach Zehnder modulator 38. An information signal input at terminal 40 is predistorted to linearize the operation of the Mach Zehnder, and input to a modulating input 36 of the modulator 38. Mach Zehnder modulator 38 will then modulate the optical carrier from modulator 30 in a conventional manner, to provide a modulated carrier for communication via an optical fiber. Those skilled in the art will appreciate that any type of intensity modulator can be used in practicing the invention, and the Mach Zehnder modulators 30, 38 are only illustrative.

Figure 2:
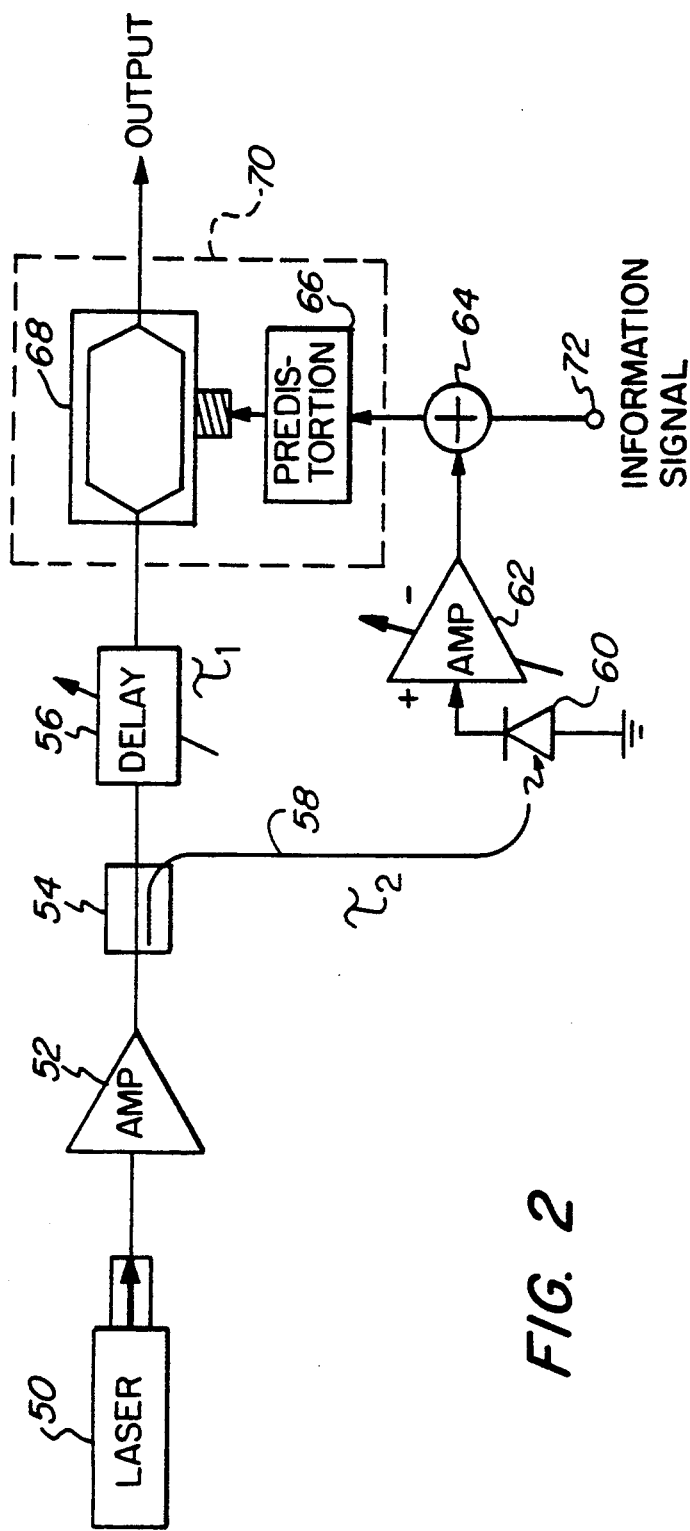
FIG. 2 is a schematic representation of a second embodiment in which a single external optical modulator receives an information signal combined with an error signal.

FIG. 2 illustrates an embodiment that uses fewer components than the embodiment of FIG. 1. Specifically, a light source such as laser 50 outputs light to an optical amplifier 52. The amplified light is input to a coupler 54, which passes the light in a primary path to a conventional variable optical delay 56. A sample of the laser output is carried via fiber 58 to a photodetector 60. A variable gain electrical inverting amplifier 62 receives the sampled output, in the electrical domain, from photodetector 60. The amplified, inverted signal output from amplifier 62 is an error signal representative of the RIN contained in the light from laser 50 and/or optical amplifier 52. This error signal is added in an adder 64 to an information signal input at terminal 72. The combined electrical signal is input to a linear external optical modulator 70, where it is predistorted by predistortion circuitry 66 and input to the modulating input of a Mach Zehnder modulator 68. The error signal portion of the modulating signal reduces the RIN in the light carried by the primary path. This results in a clean optical carrier for modulation by the information signal. Optimization of the RIN reduction is accomplished by adjusting optical delay 56 and the gain of amplifier 62. This provides a delay $\tau_1$ in the primary path that is equal to the delay $\tau_2$ in the error signal path, and provides the error signal at a proper amplitude for effective cancellation of the RIN.

Figure 3:
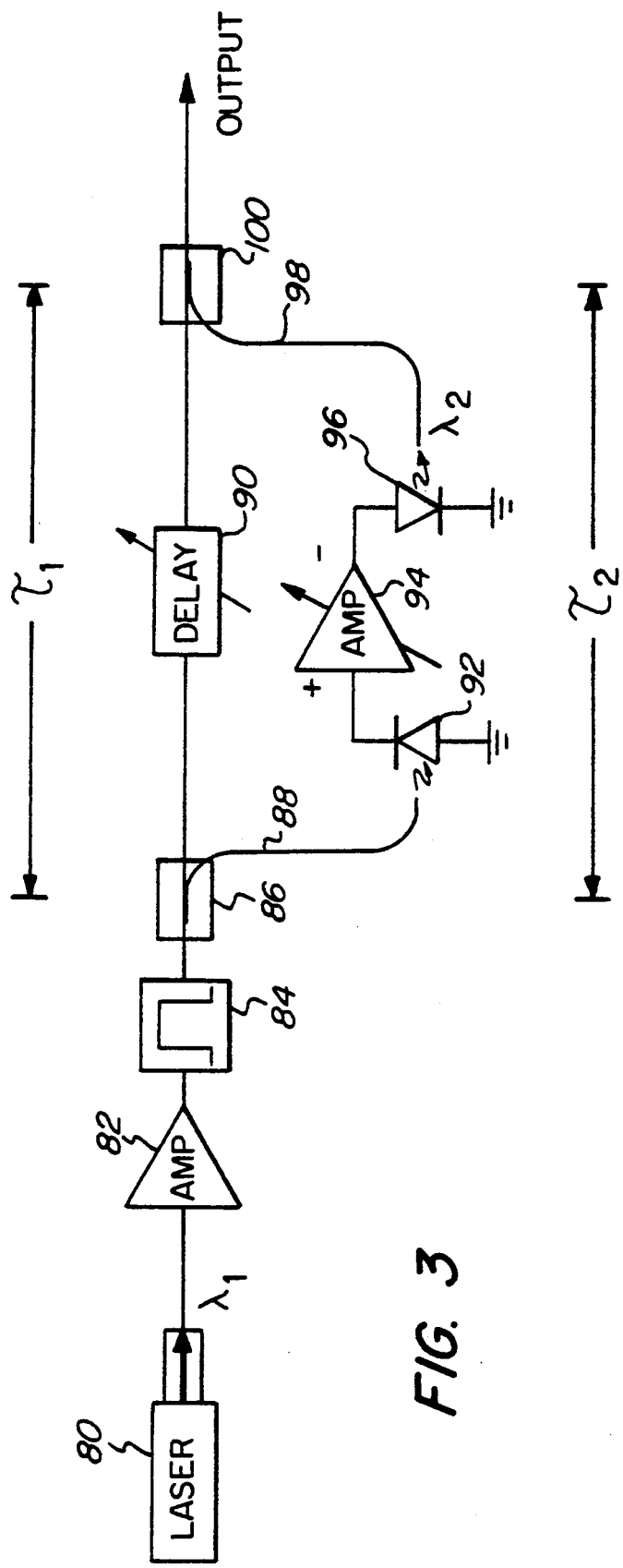
FIG. 3 is a schematic representation of another embodiment of the present invention in which an error signal is directly coupled into the optical carrier.

FIG. 3 illustrates another embodiment of the invention, in which an optical error signal is directly combined with the light in a primary path for RIN reduction. A light source such as laser 80 outputs light at a first wavelength $\lambda_1$. This light is amplified in an optical amplifier 82, and filtered by a bandpass filter 84. Filter 84 is used to remove most of the optical amplifier spontaneous emission. The filtered light is input to an optical coupler 86, that diverts a portion thereof via fiber 88 to a photodetector 92. Most of the light input to coupler 86 continues in a primary path where it is delayed by a variable optical delay 90.

Photodetector 92 provides an error signal that is a measure of the relative intensity noise contained in the light from light source 80. The error signal is inverted in a variable gain electrical inverting amplifier 94, and used to drive a laser diode 96 that operates at a second wavelength $\lambda_2$. The light output from laser diode 96 is carried via a fiber 98 to an optical coupler 100, where it is combined with the delayed amplified and filtered light from laser 80 to effect a cancellation of the RIN in the laser light. In this manner, a clean optical carrier having reduced RIN is output from coupler 100.

As with the earlier examples, variable delay 90 is adjusted to provide a delay $\tau_1$ in the primary path that is equal to the delay $\tau_2$ in the error signal path. Also, the gain of electrical inverting amplifier 94 is adjusted to provide the error signal at a proper amplitude for optimal cancellation of the RIN. In general, and particularly if the optical carrier produced by the apparatus of FIG. 3 is to be used with optical amplifiers, it is desirable to have wavelength $\lambda_1$ close to wavelength $\lambda_2$, but not so close that any beat frequencies resulting therefrom will be less than the electrical bandwidth of the fiber communication system. For example, if the optical carrier is to be used in a VSB-AM subcarrier system utilizing subcarrier frequencies up to 1 GHz, the frequency $f_1$ that corresponds to wavelength $\lambda_1$ should be more than 1 GHz higher than the frequency $f_2$ that corresponds to wavelength $\lambda_2$. By keeping $\lambda_2$ close to $\lambda_1$ within this constraint, optical bandpass filter 84 will effectively remove most of the optical amplifier spontaneous emission, which could otherwise saturate a downstream optical amplifier.

It should now be appreciated that the present invention provides apparatus for producing optical carriers with low relative intensity noise. An error signal representative of the relative intensity noise contained in light from a light source is generated. The error signal is used to externally modulate the light from the light source, or is converted to an optical signal and coupled to the light from the light source. Resultant cancellation substantially reduces the relative intensity noise in the optical signal.

Although the invention has been described in connection with specific embodiments thereof, those skilled in the art will appreciate that numerous adaptations and modifications may be made thereto without departing from the spirit and scope of the invention as set forth in the claims.

What is claimed is:

1. Apparatus for producing an optical carrier with low relative intensity noise comprising:
    a light source;
    means for sampling a portion of light output from said light source;
    means for generating an error signal from said sampled portion, said error signal being representative of relative intensity noise contained in the light from said light source; and
    means for subtracting said error signal from light output from said light source to provide an optical carrier in which the relative intensity noise has been substantially reduced.

2. Apparatus in accordance with claim 1 wherein said subtracting means comprise a first external optical modulator coupled to modulate the light output from said light source and to receive said error signal as a modulating input.

3. Apparatus in accordance with claim 2 wherein said subtracting means further comprise an inverter for inverting said error signal prior to input to said external optical modulator.

4. Apparatus in accordance with claim 2 further comprising:
    a second external modulator coupled to receive said optical carrier from an output of said first external modulator;
    said second external modulator having a modulating input for receiving an information signal to be modulated onto said optical carrier.

5. Apparatus in accordance with claim 1 further comprising:
    means for adjusting the phase and amplitude of said error signal to minimize the relative intensity noise in said optical carrier.

6. Apparatus in accordance with claim 1 wherein said error signal is generated in the electrical domain, said apparatus further comprising:
    means for converting said sampled portion of light into an electrical signal; and
    means for converting said error signal to an optical signal for subtraction from the light output from said light source.

7. Apparatus in accordance with claim 1 further comprising an optical amplifier for amplifying the light from said light source prior to said sampling means.

8. Apparatus in accordance with claim 1 further comprising an optical amplifier coupled to an output of said light source, wherein:
    said sampling means sample a first portion of light prior to said optical amplifier and a second portion of light after said optical amplifier; and
    said error signal is generated from the difference between said first and second portions.

9. Apparatus for producing an optical carrier with low relative intensity noise comprising:
    a first light source for producing light at a first wavelength $\lambda_1$;
    means for sampling a portion of the light output from said first light source and providing an electrical error signal therefrom, said error signal being representative of relative intensity noise contained in the light from said first light source;
    a second light source for producing light at a second wavelength $\lambda_2$ and responsive to said error signal to provide an optical error signal equivalent to said electrical error signal; and
    means for combining said optical error signal with light output from said first light source to provide an optical carrier in which the relative intensity noise has been substantially reduced.

10. Apparatus in accordance with claim 9 wherein:
    said optical carrier is provided for use in a communications system having an electrical bandwidth $\beta$; and
    the wavelengths $\lambda_1$ and $\lambda_2$ are selected to be substantially as close as possible without creating beat frequencies thereof within said bandwidth $\beta$.

11. Apparatus in accordance with claim 9 wherein:
    said optical carrier is provided for use in a communications system having an electrical bandwidth $\beta$; and
    the wavelengths $\lambda_1$ and $\lambda_2$ are selected to avoid the occurrence of beat frequencies thereof within said bandwidth $\beta$.

12. Apparatus in accordance with claim 11 further comprising:
    an optical amplifier coupled to amplify the light from said first light source prior to said combining means.

13. Apparatus in accordance with claim 12 further comprising:
    a bandpass filter coupled downstream of said optical amplifier for removing at least a portion of spontaneous emission introduced by said optical amplifier.

14. Apparatus in accordance with claim 13 wherein said bandpass filter is coupled immediately downstream of said optical amplifier.

15. Apparatus in accordance with claim 9 further comprising:
    an external modulator coupled to receive said optical carrier;

said external modulator having a modulating input for receiving an information signal to be modulated onto said optical carrier.

16. Apparatus in accordance with claim 9 further comprising:
means for adjusting the phase and amplitude of said error signal to facilitate the reduction of the relative intensity noise in said optical carrier.

* * * * *